3,493,361
RIPENING OF SUGARCANE BY USE OF QUATERNARY AMINES SUCH AS CHLOROCHOLINE CHLORIDE
Louis G. Nickell and Tyrus Tanimoto, Honolulu, Hawaii, assignors to Hawaiian Sugar Planters' Association, Honolulu, Hawaii, a voluntary, non-profit agricultural organization
No Drawing. Filed Jan. 11, 1968, Ser. No. 696,997
Int. Cl. A01n 5/00, 7/00
U.S. Cl. 71—121                                                  8 Claims

ABSTRACT OF THE DISCLOSURE

Sucrose yield of sugarcane is increased by treating sugarcane a few weeks prior to harvest with a quaternary amine salt such as 2-chloroethyltrimethylammonium chloride, also known as chlorocholine chloride.

BACKGROUND OF INVENTION

Considerable progress has been made in the last several years in increasing the sugar yield of sugarcane by improving the varieties being planted, enriching the soil with fertilizers and irrigating the soil in climates which do not naturally provide sufficient moisture for optimum plant growth. More recent efforts in improving sugar production have increasingly turned toward the use of chemicals in modifying and controlling the physiological processes of sugarcane, particularly its ripening prior to harvest. See U.S. Patents 3,224,865; 3,245,775 and 3,291,592. With some compounds previously suggested for this purpose, there has been some concern about their resistance to breakdown in the plant and their persistence in the soil. Consequently, extensive efforts continue to be made in searching for effective and safe chemical agents that can be used to modify the ripening of sugarcane so as to increase the sucrose yield therefrom. Generally speaking, chemicals selected for evaluation have been of types which have been previously found active in work with other plants as plant hormones, herbicides or inhibitors of growth of terminal buds, or active in killing the spindle of cane upon topical micro-application, etc.

However, among the compounds heretofore found to be useful for such other special purposes only very few have been found effective in controlling the ripening of sugarcane in the desirable manner. No relationship has been recognized to date between the chemical structure of such compounds and (a) their phytotoxic effects, (b) their physiological effects on the morphogenetic development of the plant, and (c) their activity in having positive effects on ripening. In other words, the effectiveness of a compound in controlling the ripening of sugarcane and thereby increasing sugar yield remains essentially unpredictable, and the search for suitable agents continues to be fundamentally empirical.

For instance, in reviewing the literature, it can be seen that considerable work has already been done in using chlorocholine chloride and other related substituted cholines to achieve various effects related to plant growth. See N. E. Tolbert, Jour. Biol. Chem. 235: 475–479 (1960) and Plant Physiol. 35: 380–385 (1960). Among the effects thus observed are, for instance, the production of sturdier and more compact plants; the production of darker green leaves; no effect on flowering time and flower size in certain plants but promotion of flower bud initiation and development on woody plants such as azaleas, apples, pears and citrus; etc. Significantly, however, although there are many publications concerning this compound and its effects on a large number of horticultural and agricultural plants, no reference has been found to indicate that it has ever been applied to sugarcane for any purpose. Heretofore, applicants' own work has only pointed to a few quaternary amine compounds as holding promise in increasing the yield of sugarcane, but with indications that such compounds should contain an alkyl group of at least six carbon atoms and that quaternary amine salts containing a higher alkyl group such as octadecyl should be particularly effective. Such previously tested compounds have tended to dry the spindle leaf of the treated plants.

It is an object of this invention to provide a new agent for controlling the ripening of sugarcane. A more specific object is to increase the sucrose yield of sugarcane by chemically treating it during its final ripening stages prior to harvest without introducing substantial toxicological hazards, and preferably without causing any visible damage to the cane plant such as drying of the spindle or other leaf. Still more specifically it is an object to increase the sucrose yield of sugarcane by treating it prior to harvest with a chemical agent which is sufficiently stable to provide the desired effect over a period of several weeks and thus give adequate operational flexibility, but which has a relatively low degree of persistence and is susceptible to autodecomposition or decomposition by soil bacteria. Compounds which increase the sucrose content of sugarcane only temporarily over a period of two or three weeks after application and then result in a substantial decrease are generally not desirable for the intended purpose.

SUMMARY OF INVENTION

It has now been discovered that excellent results in increasing the sucrose yield of sugarcane can be obtained by treating the younger, growing parts of the cane stalk a few weeks before harvest with a quaternary amine compound wherein all four of the radicals attached to the amine nitrogen atom have a chain of not more than three carbon atoms, 2-chloroethyltrimethylammonium chloride or chlorocholine chloride being the preferred agent of this kind.

The preferred usage form in this invention is a mixture containing the quaternary amine salt in an aqueous solution or suspension utilizing one or a combination of surface active agents variously known as wetting agents, detergents or emulsifying agents. While chlorocholine chloride is the preferred active material used in the present invention, other quaternary amines corresponding to the formula

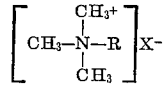

wherein R is 2-bromoethyl or 2,3-n-propylene and X is chlorine or bromine, can be used to give similar results. 2-bromoethyl trimethylammonium bromide and 2,3-n-propylenetrimethylammonium chloride are representative of such other compounds.

In accordance with this invention the sugarcane crop is treated with chlorocholine chloride or with one of the other quaternary amine salts heretofore indicated, or with a composition containing one or more of such compounds, at any time from two to ten weeks before harvest, the preferred time for treatment being between about three and eight weeks prior to harvest.

Good results are obtained when surgarcane crop is treated at a rate in the range of from about 1 to about 4 pounds of the kind of quaternary amine salt referred to above per acre of sugar cane, though higher rates of up to about 10 pounds or more per acre as well as rates lower than 1 pound per acre can be used. The optimum amount will vary somewhat depending on the specific treating composition applied, environmental conditions, time of year, age of cane and in some cases the specific variety of cane being treated, but can be readily determined for each particular case by preliminary testing.

The active agent is conveniently applied in the field in the form of an aqueous solution or suspension, e.g., a liquid composition which may be sprayed from a boom-spray or a solid dust composition where the active compound is diluted with an inert solid such as clay and which can be applied as a dust from an airplane. In preparing suitable liquid compositions, surface active agents of the type described for instance in U.S. Patent 3,224,-865, column 2, lines 61–66 or in U.S. Patent 3,245,775, column 2, lines 57–64 are convenient to use. The preferred surfactants for use in liquid compositions of the present invention are those of the non-ionic type, e.g., alkyl phenoxy poly(ethylene-oxy)ethanols such as adducts of nonylphenol and ethylene oxide; trimethyl nonyl polyethylene glycol ethers; polyethylene oxide adducts of fatty and resin acids; and long chain alkyl mercaptan adducts with ethylene oxide.

With the type of boom-spray apparatus used in this work, it has been found convenient to apply the active quaternary amine compound to the sugarcane field in the form of aqueous solutions, suspensions or emulsions having a concentration of active agent such that the application at the rate of from 7 to 20 gallons of liquid composition per acre will provide the required dosage of active chemical. However, the use of lower or higher gallonages may be preferred when a different dispensing mechanism is used.

The preferred carrier for the chlorocholine chloride or similar active chemical is water to which about 0.1 to 2% by weight of surface active agent has been added. However, instead of using water as the carrier, non-phytotoxic mineral oils either as such or in the form of water-in-oil or oil-in-water emulsions may be used similarly in accordance with practices which are common in the art of treating vegetation with beneficial growth control agents.

DESCRIPTION OF SPECIFIC EMBODIMENTS

Example I

Three pounds of 2-chloroethyltrimethylammonium chloride ("Cycocel") was dissolved in 20 gallons of water to which was added 0.25% (w./w.) of a surface active agent, nonyl phenylpolyethylene glycol ether condensed with ethylene oxide (Tergitol NPX). This solution was applied to field grown cane 5 weeks before harvest with a boom-spray at the rate of about 3 pounds of 2-chloroethyltrimethylammonium chloride per acre.

After samples of the above sugarcane were harvested, the top 15 joints of cane of the sampled stalks were cut off and comparisons made with similar samples from untreated cane. As can be seen from the analytical results shown below, the application of chlorocholine chloride resulted in a very substantial improvement in both juice purity and pol percent cane.

| | Juice Purity | Pol Percent Cane |
|---|---|---|
| Control (untreated) | 72.38 | 8.44 |
| 2-chloroethyltrimethyl-ammonium chloride | 78.10 | 10.63 |

The analyses in this and all the following examples were carried out by the so-called "press method" developed by T. Tanimoto, Hawaiian Planters' Record, 57, 133 (1964). Pol percent Cane is a polarimetric determination and equals the percentage of sucrose if the latter is the only substance in the solution which will rotate the plane of polarized light. In any event, determination of Pol percent Cane is a standard and effective method for determining the sucrose content of sugarcane juice.

Example II 0.5 g. of 2-chloroethyltrimethylammonium chloride was dissolved in 4 ml. water that contained as a surfactant about 0.25% (w./w.) nonylphenol which was ethoxylated to contain about 10.5 mols of ethylene oxide per mol of nonylphenol ("Tergitol NPX"). 0.3 ml. of this solution was deposited or dropped by means of a syringe with a fine needle on the spindle area at the top or last visible dewlap of each of 20 stalks of surgarcane. (A dewlap is the junction between the blade of the leaf and the sheath which clasps the stalk.) Ten of these stalks were harvested 4 weeks after such treatment and ten were harvested 5 weeks after such treatment. The top 15 joints of the treated cane as well as those of similar untreated cane were removed, combined, and analyzed as described previously. The results are given below:

| | 4 weeks | | 5 weeks | |
|---|---|---|---|---|
| | Juice Purity | Pol Percent Cane | Juice Purity | Pol Percent Cane |
| Control (untreated) | 75.78 | 8.98 | 69.28 | 7.13 |
| 2-chloroethyltri-methylammonium chloride | 85.53 | 12.29 | 83.48 | 10.72 |

Again, a very important improvement in sucrose yield was obtained as a result of the application of chlorocholine chloride to the cane. The data further show that in this case a delay of 4 weeks between application and harvest gave a somewhat greater improvement than a 5-week delay, indicating that the first set of conditions was more nearly optimum. However, it is also evident that the effect of chlorocholine chloride is sufficiently durable to lend the process ample operational flexibility.

Example III

The procedure of Example II was repeated after an interval of about 23 weeks on other stalks of the same sugarcane crop and the following results were obtained:

| | 5 weeks | |
|---|---|---|
| | Juice Purity | Pol Percent Cane |
| Control (untreated) | 74.92 | 8.70 |
| 2-chloroethyltrimethyl-ammonium chloride | 78.11 | 9.85 |

The results again show a distinct improvement in sucrose yield resulting from treating the cane with chlorocholine chloride. Furthermore, viewed in the context of Example II, the combined data indicate that chlorocholine chloride is highly effective for the intended purpose relatively independently of the degree of ripeness which the cane has naturally reached at the time of the chemical treatment.

Example IV

When the procedure of Example I is repeated using 2-bromoethyltrimethylammonium bromide instead of 2-chloroethyltrimethylammonium chloride, similar results are obtained.

The nature, scope, utility and effectiveness of the present invention have been described and specifically exemplified in the foregoing specification. However, it should be understood that these examples are not intended to be limiting and that the true scope of the invention to be protected is particularly pointed out in the appended claims.

What is claimed is:

1. A process for increasing the sugar yield of field grown, ripening sugarcane which comprises applying to the cane at a time at least about 2 weeks and up to about 9 weeks prior to harvest a quaternary amine salt corresponding to the formula

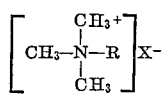

wherein R is 2-chloroethyl, 2-bromoethyl or 2,3-n-propylene and wherein X is chlorine or bromine, said salt being applied to the cane at a rate corresponding to from about 1 to about 10 pounds of salt per acre.

2. A process according to claim 1 wherein the quaternary amine salt is chlorocholine chloride.

3. A process according to claim 1 wherein the quaternary amine salt is 2-bromoethyltrimethylammonium bromide.

4. A process according to claim 1 wherein the quaternary amine salt is 2,3-n-propylenetrimethylammonium chloride.

5. A process according to claim 2 wherein the chlorocholine chloride is applied to the cane in admixture with water as a carrier.

6. A process according to claim 2 wherein the chlorocholine chloride is applied to the cane in the form of an aqueous solution or suspension at the rate of about 5 to 10 gallons of aqueous composition per acre.

7. A process according to claim 6 wherein the aqueous composition contains between 0.1 and 2% by weight of a surface active agent.

8. A process according to claim 6 wherein the aqueous composition contains between 0.1 and 2% by weight of a non-ionic surface active agent.

References Cited

UNITED STATES PATENTS

| | | |
|---|---|---|
| 3,291,592 | 12/1966 | Evans. |
| 3,376,126 | 4/1968 | McConnell et al. _____ 71—76 |
| 3,395,009 | 7/1968 | Oettel et al. _____ 71—76 |

LEWIS GOTTS, Primary Examiner

G. HOLLRAH, Assistant Examiner

U.S. Cl. X.R.

71—76